April 2, 1940.　　　　　J. N. NELSON　　　　　2,195,897
FINGER PIECE MOUNTING
Filed May 12, 1937
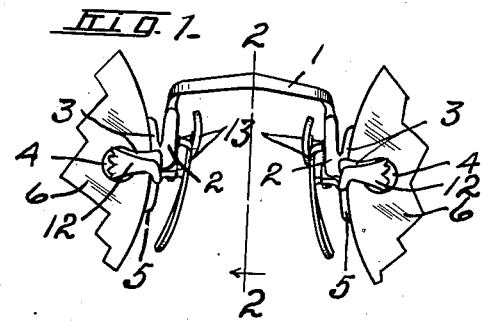
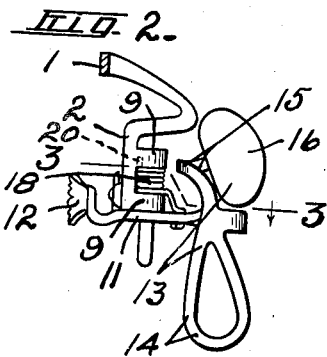
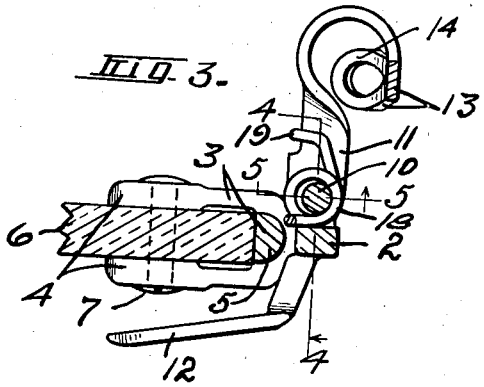
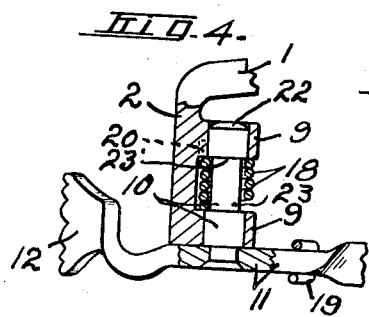
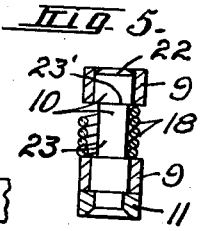
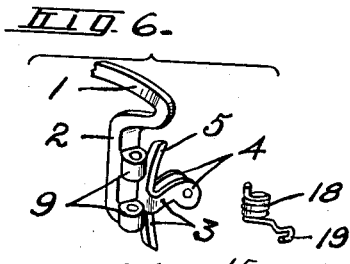
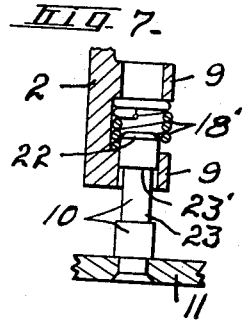
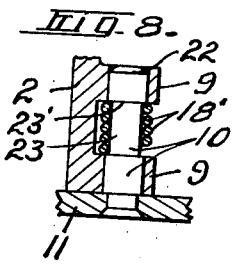
INVENTOR
John N. Nelson
BY
Theodore E. Simonton
ATTORNEY Patented Apr. 2, 1940

2,195,897

UNITED STATES PATENT OFFICE 2,195,897

FINGER PIECE MOUNTING

John N. Nelson, Rochester, N. Y., assignor to Shuron Optical Company, Inc., Geneva, N. Y., a corporation of New York Application May 12, 1937, Serial No. 142,236

3 Claims. (Cl. 88—50)

This invention relates to new and useful improvements in eyeglass structures and pertains more particularly to a finger piece mounting for releasably securing the eyeglasses to the nose of the user.

In certain conventionally constructed finger piece mountings for eyeglasses with which applicant is acquainted, the spring tensioned finger pieces, the nose piece or bridge and the lens straps are so constructed and connected with each other that the lenses are maintained thereby in such widely spaced relation to each other that only the smaller size lenses can be used therewith due to the optical centers of the lenses being fixed quantities. Such mountings are, therefore, not adapted to be successfully utilized with the comparatively large size lenses now in common use.

One of the main objects of the invention is to provide an improved, compact finger piece mounting structure for eyeglasses, wherein the distance between the lenses is materially reduced with respect to lenses when secured to conventionally constructed finger piece mountings, while ample nasal clearance is maintained in my improved mountings whereby modern lenses of various sizes and shapes may be successfully used with this type of mounting.

Another object is to produce finger piece mountings of simplified and improved construction, whereby the spring actuated arms which support the nose engaging members or guards may be quickly and easily connected in operative relation with the lens straps and the nose piece or disconnected therefrom without the use of screws or tools and wherein these arms may freely swing about a fixed axis with respect to the straps and nose piece without wobbling or lost motion.

Further advantages obtained in my novel structure reside in the additional space obtainable for the arm actuating springs and the position of said springs with respect to the nose piece or bridge, whereby not only a longer, stronger and more flexible spring may be used than that used in conventional structures of this type, but said springs and the parts immediately associated therewith, such as the pivotal means for the guard arms, are practically completely concealed by the bridge structure when the glasses are in the operative position during use. In other words, I have not only produced a finger piece mounting of improved structure, but one with which the artistic appearance of the eyeglasses as a whole may be enhanced to an appreciable extent.

Other objects and advantages pertaining to the specific construction of my device and to the form and relation of the parts thereof will more fully appear from the following description taken in connection with the accompanying drawing, in which:

Figure 1 is a front face view of a pair of eyeglasses embodying the various features of this invention and wherein the major portion of the lenses have been broken away.

Figure 2 is an enlarged vertical sectional view taken on line 2—2, Figure 1.

Figure 3 is a fragmentary horizontal sectional view taken substantially in the plane of line 3—3, Figure 2.

Figures 4 and 5 are detail vertical sectional views taken respectively on lines 4—4 and 5—5, Figure 3.

Figure 6 is a perspective view illustrating various units of my novel finger piece mounting shown in disassembled relation with the adjacent portion of the nose piece or bridge and the lens strap connected therewith.

Figure 7 is a vertical sectional view, similar to Figure 4, showing a slightly modified form of my invention with the finger piece mounting stud partially assembled with the spring and the bearing supporting members therefor.

Figure 8 is a sectional view, similar to Figure 7, with the finger piece mounting stud, spring and nose piece mounted in operative relation with each other.

The construction shown in the drawing comprises a nose piece or bridge I provided with substantially vertically disposed shanks 2. The lower or free end portion of each shank 2 is secured, in any suitable manner, to a respective one of two lens straps 3 arranged adjacent the outer vertical edge of the bridge shank. Each of these lens straps 3 comprises a pair of spaced ears 4 and a lens shoe 5. The ears 4 of each lens strap are provided with aligned holes adapted, when the strap is mounted upon the lens, as 6, with the edge of the lens engaging the shoe 5, to register with a suitable hole provided in the lens for receiving a lens screw 7 therethrough by which the lens strap and lens are connected with each other in the usual manner. It will be understood, however, that when each lens is mounted in a frame or rim, these lens straps may be dispensed with, and each bridge shank connected directly to a rim or to any other suitable form of lens support.

Each of the bridge shanks 2 is provided with a pair of vertically disposed tubular bearing members 9 connected with the rear vertical edge thereof in axial spaced relation to each other. Journaled in each pair of bearing members 9 is a stud or post 10 which is adapted to extend downwardly a short distance below the lower bearing member and has the lower end thereof fixedly secured, in any suitable manner, to a guard arm 11 positioned beneath the lower end of the respective bridge shank to swing in a substantially horizontal plane with respect to said shank and the lens strap 3 connected therewith. One end of each arm 11 extends forwardly from the stud 10 beneath the corresponding bridge shank to a position a short distance in front of the adjacent ear of the corresponding lens strap and has the outer end thereof extended laterally therefrom to form a finger piece 12 disposed in front of the adjacent lens strap. The other or rear end of each arm 11 extends rearwardly from the stud 10 connected therewith and is connected, in any suitable manner, with a nose guard 13.

The nose guard 13 may be of any suitable construction and, as shown in the drawing, comprises an enlarged substantially flat portion 14 extending downwardly from the inner end of the corresponding guard arm 11 and an upwardly extending relatively narrow strap portion 15 which is connected in any suitable manner with a guard pad 16.

A coiled wire spring 18 is mounted upon each stud or post 10 intermediate the corresponding bearing members 9. One end of each spring extends rearwardly and downwardly from the corresponding stud and is provided with a hook 19 which engages the outer edge of the rear portion of the adjacent guard arm 11, as shown in Figure 3. The other end of each spring 18 extends upwardly into engagement with the outer side surface of the adjacent upper disposed bearing member 9, as indicated by broken lines at 20, Figures 2 and 4. The upper end of each stud or post 10 is preferably slightly rounded, as at 22, to permit the same to readily pass through the coils of the spring 18 associated therewith. Each stud 10 is also provided with a peripheral groove or recess 23 formed intermediate the ends thereof and which, when the stud is mounted in the bearing members 9, is adapted to be positioned intermediate said members for receiving the spring 18 therein.

In the structure shown in Figures 1 to 6, inclusive, the diameter of the passage through the coils of each spring 18 is equal to or slightly greater than the diameter of the upper end portion of the stud 10, so as to readily receive the stud therethrough. It therefore follows that the coils of the spring are moved laterally with respect to the stud 10 when the ends of the spring are brought into engagement with the bearing member 9 and guard arm 11 during the assembling of the arm with the nose piece so that at least a portion of the upper coil of the spring will move into the recess 23 and into engagement with a shoulder 23' formed at the upper end of the recess.

The axial length of the coil portion of each spring 18 is substantially equal to the distance between the bearing members 9 of each pair so that when the upper coil of the spring is in engagement with the shoulder 23', the lower coil of said spring will be in engagement with the upper surface of the lower bearing member 9 and will thereby prevent the removal of the stud 10 from the bearing members when the spring is in operative engagement with the arm 11.

It will now be observed, by referring more particularly to Figure 6, that my novel eyeglass mounting structure comprises three separate and distinct units: One, the nose bridge 1, lens strap 3 and tubular bearing members 9; two, spring 18; and three, guard arm 11, guard 13 and stud 10. In assembling these three units, it will be observed that it is only necessary to place the spring 18 intermediate a pair of bearing members 9 in substantially coaxial relation therewith, then a guard arm unit is operatively connected with the nose piece and spring by inserting the stud 10 connected therewith upwardly through the lower bearing member 9 and spring 18 into the upper bearing member 9, after which the spring and stud are locked in position by merely bringing the hook 19 into engagement with the outer rear edge of the arm 11. This placing of the hook 19 into engagement with the arm 11 not only properly tensions the spring but also simultaneously produces lateral movement of the spring with respect to the stud 10 to bring one side thereof into registration with the adjacent portion of the stud recess 23, whereupon the upper coil of the spring is moved beneath the shoulder 23' of the stud and will prevent downward displacement of the stud as long as the hook 19 is in engagement with the arm 11.

When it is desired to remove the guard arm unit from operative engagement with the nose piece 1, it is only necessary to unhook the spring 18 from the arm 11 and then withdraw the stud 10 from engagement with said spring and the bearing members 9.

In the slightly modified structure shown in Figures 7 and 8, the spring 18 has the passageway therethrough of a diameter equal to or slightly less than the diameter of the upper end portion of the stud 10. It, therefore, follows that as the stud is inserted through the spring opening, the coils of said spring will be slightly expanded until they register with the recess 23, and they are free to contract to their normal contour as the upper end portion of the stud enters the upper bearing member 9. It will, therefore, be seen that the spring will engage the shoulder 23' with sufficient friction to maintain the stud in position within the bearing members 9 against being accidentally removed therefrom before the hook 19 of the spring is brought into engagement with the arm 11. However, as the spring is secured to the arm 11 by the engagement of the hook 19 with said arm, the tensioning of the spring produced thereby will slightly contract the coils and maintain the upper coil in contact with the shoulder 23' of the stud throughout a greater portion of the circumferential area of the shoulder.

It will now be readily understood that the various units of my novel finger piece mounting structure may be assembled or disassembled with respect to each other without the use of screws or other auxiliary fastening means and that, owing to the bearing members 9 being located at the rear of the bridge shanks 2, the springs 18, bearing members 9 and studs 10 will be substantially concealed thereby from a position in front of the eyeglasses.

Furthermore, it will be observed that by positioning the bearing members 9 and stud 10 at the rear of the bridge shank, these members do not extend into the nasal space between the bridge shanks neither do they interfere with the shanks being connected directly to the lens straps or other lens supports with the result that the distance between the bridge shanks and the lens supports and, therefore, between the lenses connected with the bridge may be reduced to a minimum. It is obvious, therefore, that not only relatively large lenses, but also lenses having various polygonal outer configurations, as now in common use, may be utilized with my novel mounting.

Although the structure and operation of my device are particularly simple, practical and efficient, I do not wish to be limited to the specific construction shown as it is evident that various changes may be made therein without departing from the spirit of the invention as set forth in the appended claims.

I claim:

1. An eyeglass construction comprising a bridge member having shanks at each side thereof, lens supporting members connected with said shanks, a pair of arms adapted to support nose engaging elements, means pivotally connecting said arms with the bridge shanks whereby the arms may swing in substantially a horizontal plane beneath said shanks including substantially vertically disposed studs fixedly connected with the arms to extend upwardly therefrom, two pairs of bearing members connected with said shanks at the rear vertical sides thereof, the bearing members of each pair being arranged in vertical spaced relation to each other and with the lower bearing member thereof substantially flush with the lower end of the corresponding shank, and springs coiled upon the studs intermediate said bearing members and engaging said arms for producing swinging movement thereof, each of said studs being provided with a peripheral recess intermediate the corresponding bearing members for receiving said spring coil therein as said spring is moved into engagement with the arm whereby said spring coacts with said bearing members for releasably maintaining the stud in operative engagement with the bearing members.

2. In a finger piece mounting for eyeglasses comprising a pair of lens supporting members, a bridge connecting said lens supporting members and having shanks at each side thereof, and a pair of arms adapted to support nose engaging elements and arranged to swing below said shanks, the combination of bearing means on said shanks comprising two pairs of boss members, one pair for each shank, the bosses of each pair being arranged in vertical spaced relation to each other and being provided with aligned substantially vertically disposed apertures, studs mounted in said apertures and extending through the space between said bosses, the lower end of each stud being secured to one of said pair of arms, and coil springs mounted on said studs intermediate said bosses and engaging said arms under tension for producing swinging movement thereof about the axes of said studs, said studs having stop shoulders provided thereon and engaged by said springs when the springs are under tension, whereby said springs releasably maintain the studs in said bosses against axial displacement with respect thereto.

3. In a finger piece mounting for eyeglasses comprising a pair of lens supporting members, a bridge connecting said lens supporting members and having shanks at each side thereof, and a pair of arms adapted to support nose engaging elements and arranged to swing below said shanks, the combination of bearing means on said shanks comprising two pairs of boss members, one pair for each shank, the bosses of each pair being arranged in vertical spaced relation to each other and being provided with aligned substantially vertically disposed apertures, studs mounted in said apertures and extending through the space between said bosses, the lower end of each stud being secured to one of said pair of arms and each of said studs being provided with a peripheral recess intermediate said bosses, and coil springs mounted on said studs intermediate said bosses and engaging said arms for producing swinging movement thereof about the axes of said studs, said springs being received in said recesses and co-acting with said bosses and constituting the sole means for releasably maintaining said studs in said bosses.

JOHN N. NELSON.